MEMORY
Filed June 29, 1962
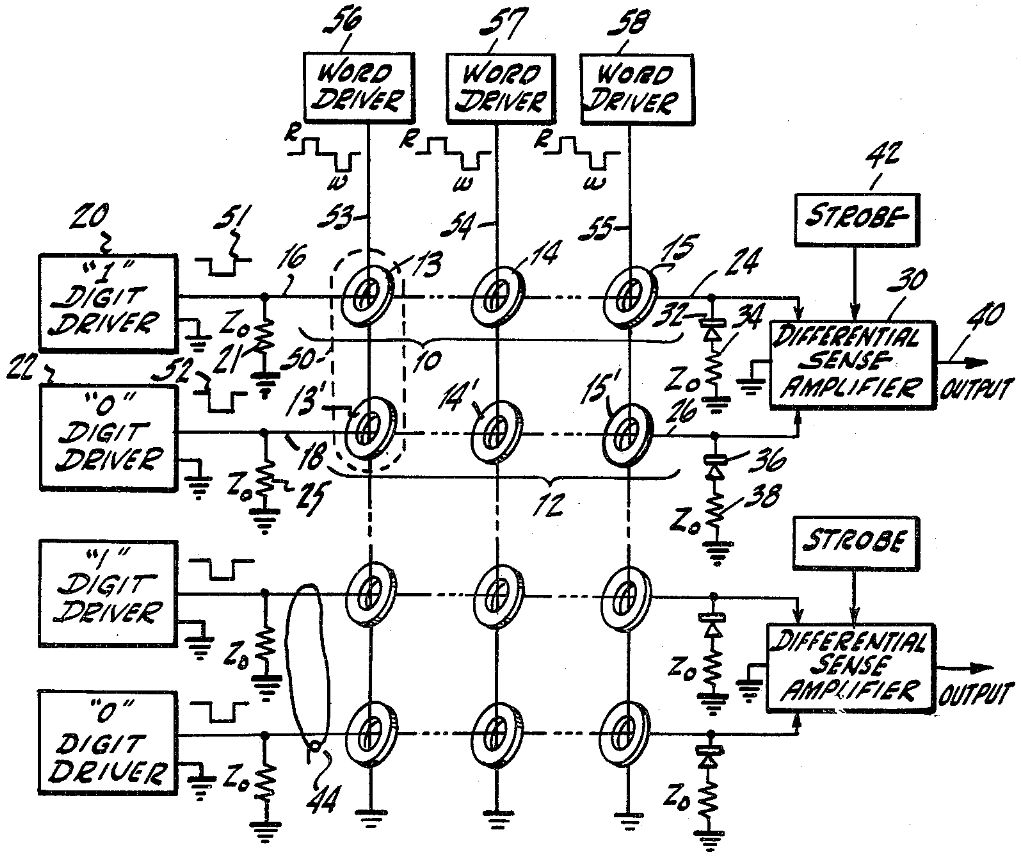
INVENTORS
RICHARD L. PRYOR &
THOMAS R. MAYHEW
BY Carl V. Olson
Attorney

1

3,181,131

MEMORY

Richard L. Pryor, Haddonfield, and Thomas R. Mayhew, Levittown, N.J., assignors to Radio Corporation of America, a corporation of Delaware Filed June 29, 1962, Ser. No. 206,300
8 Claims. (Cl. 340—174)

This invention relates to information storage systems, and particularly to random access memories.

Random access memories are often constructed in the form of rows and columns of ferrite magnetic core memory elements threaded by row and column conductors. There is a demand for memories capable of faster operation, and there is also a demand for memories of ever increasing information storage capacity. One way of increasing the speed of operation of a memory is to employ two memory elements for each bit of information in such a way as to cancel disturbances which otherwise limit the speed of operation.

When attempts are made to increase the speed of operation of a memory, and when attempts are made to increase the information storage capacity, the time required for an electrical pulse to travel along a conductor in the memory array becomes significant in relation to the width of the pulse and in relation to the time of occurrence of cooperating pulses in the system. The conductors threaded in the memory elements can no longer be considered as merely wires, but must be analyzed and designed in terms of propagation delays and impedance terminations that prevent reflections.

It is an object of this invention to provide an improved memory array configuration providing high speed operation and minimizing the undesired consequences of propagation delays in conductors threaded through the array.

It is another object to provide an improved wiring arrangement for a memory system including two memory elements per bit.

It is a further object to provide an improved memory including a digit-sense conductor having a digit driver at one end, a sense amplifier at the opposite end and means to accommodate both digit and sense signals on the conductor.

It is a still further object to provide an improved memory including a common digit-sense conductor having means to prevent disturbing reflections from the ends of the conductors.

According to an example of the invention, a memory array is constructed having a plurality of word conductors and a plurality of pairs of orthogonally related digit-sense conductors. Memory elements such as ferrite magnetic cores are provided at all crossovers of the conductors. At one end of each pair of digit-sense conductors, a "1" digit driver is coupled to one conductor of the pair, and a "0" digit driver is coupled to the other conductor of the pair. A differential sense amplifier is coupled to the opposite end of each digit-sense conductor pair. Each two memory elements linked by a word conductor and the two conductors of a digit-sense conductor pair are used for the storage of one bit of information.

Each digit-sense conductor has a length in relation to the speed of operation of the system so that its distributed reactances make the conductor a transmission line having a characteristic impedance. A diode and a resistor having the value of the characteristic impedance of the line are connected in series from the sense amplifier end of each digit-sense conductor to a return path such as ground. A digit pulse arriving at the sense amplifier end of the line renders the diode conductive and is dissipated in the characteristic impedance resistor without being reflected back along the digit-sense line. The disturbing effect of a reflected digit pulse is thus avoided. A sense signal induced on a digit-sense lines has a much smaller amplitude so that it does not render the diode conductive and is directed to the sense amplifier without being dissipated in the resistor.

2

These and other objects and aspects of the invention will be apparent to those skilled in the art from the following more detailed description taken in conjunction with the appended drawing, wherein the sole figure of the drawing illustrates a memory array employing two memory elements or cores for the storage of each information bit. A pair of digit-sense conductors 10 and 12 each thread or link a plurality of memory elements or cores 13, 14, 15, and 13', 14', 15', repectively, equal in number to the number of words in the memory. While the digit-sense conductors 10, 12 are shown as each linking only three cores, it will be understood that the conductors will normally link a large number of cores and will have a length and distributed impedance in relation to the width and repetition rate of pulses thereon, such that the conductors must be considered to be transmission lines having a characteristic impedance $Z_0$. The distributed impedance is made up of uniformly distributed resistance, uniformly distributed capacitive reactance and inductive reactance which, although lumped at the cores, may be considered to be uniformly distributed along the line.

The digit-sense conductors 10, 12 of the conductor pair are coupled at their left-hand ends 16 and 18 to a "1" digit driver 20 and a "0" digit driver 22, respectively. These digit driver ends 16, 18 of the digit-sense conductors 10, 12 are also connected to a return path such as ground through respective resistors 21, 25 each having the characteristic impedance $Z_0$ of the conductors.

The opposite right-hand ends 24, 26 of the digit-sense conductors 10, 12 are coupled to the two respective inputs of a differential sense amplifier 30. Each input of the differential sense amplifier 30 has an input impedance to ground which is much larger than the characteristic impedance $Z_0$. The sense amplifier end 24, of the digit-sense conductor 10, is also connected through a diode 32 in series with a resistor 34 to a return path such as ground. The end 26 of digit-sense conductor 26 is similarly connected through a diode 36 in series with a resistor 38 to ground. The value of resistors 34 and 38 is selected to be equal to the characteristic impedance $Z_0$ of each digit-sense conductor 10, 12.

The differential sense amplifier 30 is biased to be normally inoperative to provide an output at output lead 40. The amplifier can provide an output only at a desired short time as determined by the application thereto of a strobe pulse from a strobe pulse generator 42.

A second similar pair of digit-sense conductors 44 and associated elements are shown to illustrate that an actual memory will contain a plurality of digit-sense conductor pairs equal to the number of information bits in each word location in the memory.

A transversely or orthogonally related word conductor 53 links all the memory elements 13, 13', etc., at the digit driver ends of the digit-sense conductors; a word conductor 54 links all the memory elements 14, 14', etc., at an intermediate point along all the digit-sense conductors; and a word conductor 55 links all the memory elements 15 at the sense amplifier ends of all the digit-sense conductors. The word conductors 53, 54 and 55 are supplied with read pulses R and write pulses W from respective word drivers 56, 57 and 58. The word conductors 53, 54 and 55 are short compared with the digit-sense conductors so that there is no significant delay in the propagation of read-write pulses down the word lines.

The two cores encircled at 50 are two cores for the storage of one bit of information of the word along the word conductor 53. To generalize, a bit of information is stored in the two cores or memory elements which are linked by a word conductor and the two conductors of a digit-sense conductor pair.

The operation of the invention will now be explained by describing the writing of a bit of information into the information bit location 50, and reading the stored information therein. If it is desired to write a "1" into the location 50, a "1" digit pulse 51 from driver 20 is applied to the end 16 of the digit-sense conductor 10 at a time such that it will arrive at the magnetic core 13 coincidentally with a write pulse W supplied to the word conductor 53 from the word driver 56. The digit pulse 51 and the write pulse W causes flux in core 13 to switch. The core 13' receives only the write pulse W which is of insufficient amplitude to cause flux in core 13' to switch. The cores 13 and 13' of the information bit location 50 then have net magnetic states representing the storage of a "1" bit of information.

The "1" digit pulse 51 travels down the digit-sense line 10 to the remote end 24 where it renders the diode 32 conductive and is dissipated in the terminating resistor 34 having the characteristic impedance $Z_0$ of the digit-sense line 10. The digit pulse may, for example, have a current of 80 milliamperes and a voltage of 15 volts, which greatly exceeds the conduction threshold, which may be 0.2 or 0.3 volt, of the diode 32. The terminating impedance 34 prevents the digit pulse from being reflected back along the digit-sense line and thus avoids the disturbing effect of a reflected digit pulse on the magnetic cores linked by the digit-sense conductor.

When it is desired to read the information stored in the bit location 50, a positive read pulse R is applied to the word line 53 by the word driver 56. The read pulse *r* causes flux in magnetic core 13 to switch back to its initial direction of magnetization, but does not cause any net change in flux in magnetic core 13', which is already magnetized in the initial direction. Therefore, a sense signal is induced on the digit-sense line 10, but not on the digit-sense line 12.

The sense signal induced in the digit-sense line 10 at the magnetic core 13, results in a positive pulse traveling to the left until it is dissipated without reflection in the terminating impedance 21 and results in a negative pulse traveling to the right until it reaches the input terminal of the differential sense amplifier 30. The sense signal, being of very small amplitude compared with the digit pulse 51, does not render the diode 32 conductive. The sense signal may, for example, have an amplitude of 0.04 volt. The diode 32 conducts only in one direction, and only when the voltage in that direction exceeds about 0.2 volt. Therefore, the sense signal is not dissipated in the terminating resistor 34, but is utilized at the input of the differential sense amplifier 30.

The input impedance of the differential sense amplifier 30 is made much greater than the characteristic impedance $Z_0$, so that the sense signal sees what is nearly an open circuit. An open circuited end of a transmission line causes a doubling of the voltage of a signal arriving at the open circuited end, and a reflection of part of the signal back along the line. The doubling of the sense signal voltage at the input of the sense amplifier 30 reduces the sensitivity requirements of the sense amplifier. The reflected portion of the sense signal returns back along the digit-sense line 10 until it reaches the characteristic impedance $Z_0$ of the terminating resistor 21, and is harmlessly dissipated.

It is thus seen that the digit-sense line 10 is properly terminated at its end 24 to prevent disturbing reflections therefrom of large amplitude digit pulses. At the same time, the termination does not attenuate the small sense signal, but rather causes it to be applied at double voltage amplitude to the input of the differential sense amplifier 30.

The foregoing has described how the application of a read pulse R to the word line 53 causes a sense signal to be induced in the line 10 due to switching of flux in core 13, and how the sense signal is applied to the differential sense amplifier 30. The sense signal results from irreversible or net switching of flux in core 13. The read pulse R on word line 53 also causes equal disturbing pulses to be induced on both digit-sense lines 10 and 12, due to reversible switching of elastic flux in the respective cores 13 and 13'. These equal disturbing pulses may have an amplitude greater than the desired sense signal on line 10. The equal disturbing pulses on lines 10 and 12 are applied to the respective inputs of the differential sense amplifier 30 and are cancelled in the sense amplifier. The differential sense amplifier responds solely to the sense signal, which represents the difference between the voltages applied to the two inputs of the amplifier.

The storage and reading of a "1" bit in the bit location 50 has been described. If it is desired to store a "0" in this location, the "0" digit driver 22 is energized at a time such that a negative digit pulse 52 reaches the magnetic core 13' coincident with the arrival there of the write pulse W from the word driver 56. In this case, the core 13' switches from the initial state and the core 13 remains in the initial state of magnetization. A read pulse R then induces a sense signal in the digit-sense line 12 which is directed to the other input of the differential sense amplifier 30 to result in a "0" output on the output lead 40 of the differential sense amplifier. Net flux change in a core on the digit-sense conductor 10 is used in the storage and reading of a "1" bit, net flux change in a core on the digit-sense conductor 12 is used in the storage and reading of a "0" information bit. Two cores are employed for each bit for the purpose, as is well known, of cancelling noise or disturbance signals due to elastic changes that might otherwise impair the reliability of response of the sense amplifier. The mode of operation described with reference to the information bit location 50 applies likewise to any other bit location in the memory illustrated in simplified form in the drawing.

In view of the fact that digit-sense lines are long and involve propagation relays in relation to the widths and repetition rates of pulses thereon, it is necessary to control the relative times at which the various digit drivers, word drivers and strobes are energized. In this connection, the arrangement wherein the digit drivers and differential sense amplifiers are at opposite ends of the digit-sense lines, permits a simplification of the timing means (not shown). In the prior art arrangement wherein the digit drivers and sense amplifiers are located at the same end of the digit-sense lines, the timing of a read pulse relative to a strobe pulse of a bit word driver must be shifted in the opposite direction compared with the timing of the write pulse relative to the digit pulse. This is in contrast to the much simpler timing arrangement that can be used when the digit drivers and sense amplifiers are at opposite ends of the digit-sense line. In this latter case, the timing of the read pulse relative to the strobe pulse is shifted in the same direction as the timing of the write pulse relative to the digit pulse.

It is thus apparent that there is provided an improved memory arrangement wherein a single conductor is employed for both digit and sense signals and wherein the conductor is terminated in such a way as to prevent reflections of the digit pulses without attenuating the small amplitude sense signals.

What is claimed is:

1. A two-element-per-bit memory system comprising
a plurality of word conductors and a plurality of pairs of transversely related digit-sense conductors,
memory elements at the crossovers of the conductors, the two memory elements at each crossover of a word conductor and a digit-sense conductor pair being used for the storage of one information bit,
a pair of digit drivers coupled to one end of each digit-sense conductor pair, one digit driver of each pair being coupled to one digit-sense conductor of a pair for the writing of a "1," and the other digit driver of the pair being coupled to the other digit-sense conductor of the pair for the writing of a "0,"

and a differential sense amplifier coupled to the other end of each digit-sense conductor pair.

2. In a two-element-per-bit memory system, the combination of a pair of digit-sense conductors each of which links an equal plurality of memory elements and has distributed reactances so that it constitutes a transmission line having a characteristic impedance, a pair of digit drivers each coupled to supply digit pulses to one end of respective conductors of the digit-sense conductor pair, a differential sense amplifier coupled to the other end of said digit-sense conductor pair, and a diode and a resistor having said characteristic impedance connected in series from the sense amplifier end of each digit-sense conductor to a return path such as ground.

3. In a memory system, the combination of a plurality of word conductors and a plurality of orthogonally related digit-sense conductors, memory elements at the crossovers of the conductors, a digit driver coupled to one end of each digit-sense conductor, a sense amplifier coupled to the other end of each digit-sense conductor, each digit-sense conductor having distributed reactances so that it constitutes a transmission line having a characteristic impedance, a return path, and a diode and a resistor having the value of said characteristic impedance connected in series from the sense amplifier end of each digit-sense conductor to said return path.

4. In a memory system, the combination of a plurality of digit-sense conductors each of which links an equal plurality of memory elements and has distributed reactances so that it constitutes a transmission line having a characteristic impedance, a plurality of digit drivers each coupled to supply digit pulses to one end of a respective digit-sense conductor, a plurality of sense amplifiers each coupled to the other end of a respective digit-sense conductor, and a plurality of non-linear impedance circuits each connected from the sense amplifier end of a digit-sense conductor to a return path such as ground, said non-linear impedance circuits each presenting said characteristic impedance to signals having the amplitude of said digit pulses whereby to prevent reflections, and presenting a very high impedance to signals having the small amplitude of sense signals whereby to increase sense signal voltages at the input to said sense amplifier.

5. In a memory system, the combination of a digit-sense conductor which links a plurality of memory elements and has distributed reactances so that it constitutes a transmission line having a characteristic impedance, a digit driver coupled to supply digit pulses to one end of said digit-sense conductor, a return path, a resistor having the characteristic impedance of said conductor connected from the digit driver end of said conductor to said return path, a sense amplifier coupled to the other end of said digit-sense conductor, and a non-linear impedance circuit connected from the sense amplifier end of each digit-sense conductor to said return path, said non-linear impedance circuit presenting said characteristic impedance to signals having the amplitude of said digit pulses whereby to prevent reflections, and presenting a very high impedance to signals having the small amplitude of sense signals.

6. A two-element-per-bit memory system, comprising a pair of digit-sense conductors each of which links an equal plurality of memory elements and has distributed reactances so that it constitutes a transmission line having a characteristic impedance, a pair of digit drivers each coupled to supply digit pulses to one end of respective conductors of the digit-sense conductor pair, a differential sense amplifier coupled to the other end of said digit-sense conductor pair, and a non-linear impedance circuit connected from the sense amplifier end of each digit-sense conductor to a return path such as ground, said non-linear impedance circuit presenting said characteristic impedance to signals having the amplitude of said digit pulses whereby to prevent reflections, and presenting a very high impedance to signals having the small amplitude of sense signals.

7. A two-element-per-bit memory system comprising a plurality of word conductors and a plurality of pairs of orthogonally related digit-sense conductors, each digit-sense conductor having distributed reactances so that it constitutes a transmission line having a characteristic impedance, memory elements at the crossovers of the conductors, a pair of digit drivers coupled to one end of each digit-sense conductor pair, a differential sense amplifier coupled to the other end of each digit-sense conductor pair, a diode and a resistor having the value of said characteristic impedance connected in series from the sense amplifier end of each digit-sense conductor to a return path such as ground, whereby a digit pulse from said digit driver is propagated down the conductor to the sense amplifier end where it renders the diode conductive and is dissipated in said resistor without appreciable reflection, and read means coupled to said word conductors to selectively switch said memory elements, whereby a sense signal induced in a digit-sense conductor and propagated therealong to said sense amplifier is of insufficient amplitude to render the corresponding diode conductive and is increased in voltage at the input of the sense amplifier.

8. The system as defined in claim 7, and in addition, a resistor having the value of said characteristic impedance connected from the digit driver end of each digit-sense conductor to said return path.

References Cited by the Examiner

UNITED STATES PATENTS

| | | | |
|---|---|---|---|
| 2,900,624 | 8/59 | Stuart-Williams | 340—174 |
| 3,003,139 | 10/61 | Perkins | 340—174 |
| 3,112,470 | 11/63 | Barrett et al. | 340—174 |

OTHER REFERENCES

Bruce, G. T.; Siegle, W. T.: IBM Technical Disclosure Bulletin, vol. 3, No. 10, March 1961, pp. 109. TK800.113.

Thome, R. E.: IBM Technical Disclosure Bulletin, vol. 3, No. 10, Mar. 10, 1961, pp. 63. TK7800.113.

IRVING L. SRAGOW, *Primary Examiner.*